United States Patent [19]

Draber et al.

[11] 3,852,056
[45] Dec. 3, 1974

[54] HETEROCYCLIC-SUBSTITUTED N-IMIDAZOL PLANT-GROWTH INFLUENCING AGENTS

[75] Inventors: Wilfried Draber, Wuppertal-Elberfeld; Erik Regel, Wuppertal-Cronenberg; Karl Heinz Büchel, Wuppertal-Elberfeld; Ludwig Eue, Cologne; Robert R. Schmidt, Leverkusen, all of Germany

[73] Assignee: Bayer Aktiengesellschaft, Leverkusen, Germany

[22] Filed: Sept. 24, 1970

[21] Appl. No.: 75,264

[30] Foreign Application Priority Data
Sept. 27, 1969 Germany.............................. 1949013

[52] U.S. Cl............................ 71/76, 71/73, 71/74, 71/75, 71/77, 71/78, 71/88, 71/90, 71/92, 260/294.8 D, 260/294.8 G, 260/294.9, 260/296 R, 260/302 H, 260/302 D, 260/308 R, 260/309, 424/263, 424/269, 424/270, 424/272, 424/273

[51] Int. Cl. .................................. A01n, A01n 9/20
[58] Field of Search ..................... 71/92, 88, 76, 78

[56] References Cited
UNITED STATES PATENTS
3,558,599 1/1971 Szmuszkoviez..................... 71/88 X Primary Examiner—James O. Thomas, Jr.
Attorney, Agent, or Firm—Burgess, Dinklage & Sprung

[57] ABSTRACT
Compositions containing heterocyclic-substituted N-benzylimidazoles of the formula

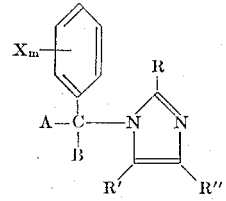

wherein
R, R' and R'' are hydrogen, lower alkyl or lower alkenyl,
X is hydrogen, halogen, lower alkyl, alkoxy, alkylthio, trifluoromethyl, nitro, cyano, amino or dialkylamino,
m is 0, 1 or 2,
A is unsubstituted or substituted phenyl or pyridyl, alkyl or cycloalkyl, and
B is a five-membered heteroaromatic ring of the general formula:

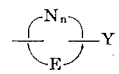

wherein
E is oxygen, sulfur

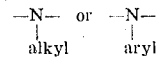

Y is hydrogen, lower alkyl, halogen or unsubstituted or substituted aryl; and
n is 0, 1 or 2 possess marked plant-growth influencing, including inhibiting and promoting, properties.

1 Claim, No Drawings

HETEROCYCLIC-SUBSTITUTED N-IMIDAZOL PLANT-GROWTH INFLUENCING AGENTS

The present invention relates to the use of certain N-benzylimidazoles for the regulation of plant growth. More particularly, the use of such compounds in which the methylene group is substituted by a five-membered heterocycle is contemplated.

It is already known that, for the regulation of the growth of higher plants, succinic acid 2,2-dimethylhydrazide, 2-chloroethyltrimethylammonium chloride and maleic acid hydrazide can be used [see Cathey, H.M., "Physiology of Growth Retarding Chemicals", Ann. Rev. Plant Phys. 15, pp. 271–302 (1964), Deutsche Auslegeschrift (German Published Specification) 1,238,052 and U.S. Pat. Nos. 2,575,954; 2,614,912; 2,614,916; 2,614,917 and 2,805,926]. The activity of these previously known compounds at low concentrations is in many cases unsatisfactory, and at high concentrations plant damage sometimes manifests itself.

The present invention provides compositions for the regulation of plant growth containing as active ingredient an N-benzylimidazole or salt thereof, the N-benzylimidazole being of the general formula:

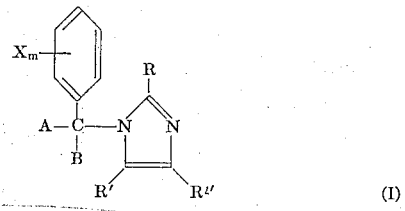

in which
R, R' and R'' are hydrogen, lower alkyl or lower alkenyl,
X is hydrogen, halogen, lower alkyl, alkoxy, alkylthio, trifluoromethyl, nitro, cyano, amino or dialkylamino,
m is 0, 1 or 2,
A is unsubstituted or substituted phenyl or pyridyl, alkyl or cycloalkyl, and
B is a five-membered heteroaromatic ring of the general formula:

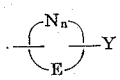

in which
E is oxygen, sulfur,

-N-   or   -N-
 |            |
alkyl       aryl

Y is hydrogen, lower alkyl, halogen or unsubstituted or substituted aryl; and
n is 0, 1 or 2.

It will be understood that, in the formula for B above, the said heteroaromatic ring will contain 4n carbon atoms. The substituent B can thus represent such radicals as isooxazolyl, isothiazolyl, thiazolyl, imidazolyl, triazolyl, thiadiazolyl, pyrazolyl, and the like, which may be substituted.

As salts of the above triarylmethyl-substituted heterocycles, those with the plant-compatible acids are suitable. Examples of such acids are the halogen hydracids, phosphoric acids, sulfonic acids, aliphatic mono- and dicarboxylic acids as well as hydroxycarboxylic acids. Preferred salts of these imidazole derivatives include the salts of hydrochloric acid, phosphoric acid, acetic acid, tartaric acid, lactic acid, malic acid, citric acid, salicyclic acid, sorbic acid and ascorbic acid.

The invention also provides a method for the control or modification of plant growth, which comprises applying to the plants or seeds thereof a compound as defined above alone or in the form of a composition containing as active ingredient a compound as defined above in admixture with a solid or liquid diluent or carrier.

It has surprisingly been found that these compounds exhibit strong plant-growth-regulating properties. It was unexpected that the compounds which are used according to the invention show a much greater growth-influencing activity than certain growth regulators known from the prior art. The substances which can be used according to the invention therefore represent a valuable enrichment in the art.

The substances to be used according to the invention are defined generally by the above formula (I).

Preferably, R, R' and R'' are hydrogen or alkyl of from 1 to 2 carbon atoms, X is hydrogen, alkyl of from 1 to 3 carbon atoms, methoxy, methylmercapto, trifluoromethyl, nitro, cyano, amino or dimethylamino, m is 0 or 1, A is phenyl or 2-, 3- or 4-pyridyl and B is one of the following radicals:

 2-thienyl.

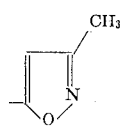 5-(3-methyl)-isoxazolyl.

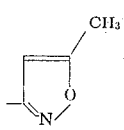 3-(5-methyl)-isoxazolyl.

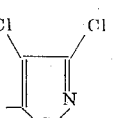 5-(3,4-dichloro)-isothiazolyl.

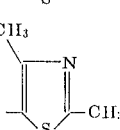 5-(3,4-dimethyl)-thiazolyl.

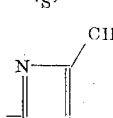 2-(4-methyl)-thiazolyl.

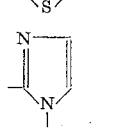 2-(1-methyl)-imidazolyl.

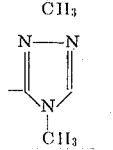 3-(4-methyl)-1,2,4-triazolyl.

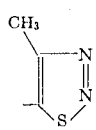 5-(4-methyl)-1,2,3-thiadiazolyl.

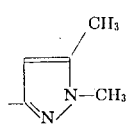 5-(2,3-dimethyl)-pyrazolyl.

As specific examples of the substances which can be used according to the invention, there are mentioned in particular the compounds listed in the following Table 1, in which the meanings of X, m, A and B in formula (I) are set forth (R, R' and R'' in formula (I) are all hydrogen).

The substances which can be used according to the invention are new. They can be prepared according to methods known in principle. They are obtained for example when a compound of the formula:

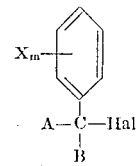 (II)

in which

A, B, X and m have the meaning stated earlier above, and

Hal stands for chlorine or bromine,

Table 1

| No. | A | B | X | m | m.p.°C |
|---|---|---|---|---|---|
| 1 | phenyl | 2-thienyl | — | 0 | 182 |
| 2 | phenyl | 2-thienyl | 4-F | 1 | 144–145 |
| 3 | phenyl | 3-(5-methyl)-isoxazolyl | — | 0 | 149–150 |
| 4 | phenyl | 3-(5-methyl)-isoxazolyl | 3-Cl | 1 | 107–110 (+ 1 HCl + 1 H₂O) |
| 5 | phenyl | 3-(5-methyl)-isoxazolyl | 4-F | 1 | 134–136 |
| 6 | phenyl | 3-(5-methyl)-isoxazolyl | 4-Cl | 1 | 166–167 |
| 7 | phenyl | 3-(5-methyl)-isoxazolyl | 3-CF₃ | 1 | 69 |
| 8 | phenyl | 5-(3-methyl)-isoxazolyl | — | 0 | 171 |
| 9 | phenyl | 5-(3-methyl)-isoxazolyl | 4-Cl | 1 | 136–137 |
| 10 | phenyl | 5-(3-methyl)-isoxazolyl | 4-F | 1 | 140–142 |
| 11 | phenyl | 5-(3-methyl)-isoxazolyl | 2-Cl | 1 | 144 |
| 12 | phenyl | 5-(3,4-dichloro)-isothiazolyl | — | 0 | 157 (+ 1 HCl + 1 H₂O) |
| 13 | phenyl | 5-(3,4-dichloro)-isothiazlyl | 4-F | 1 | 95 |
| 14 | phenyl | 2-(1-methyl)-imidazollyl | — | 0 | 200 |
| 15 | phenyl | 3-(5-methyl)-isoxazolyl | 2-Cl | 1 | 189–193 |
| 16 | phenyl | 3-(5-methyl)-isoxazolyl | 4-CH₃ | 1 | 109–111 |
| 17 | phenyl | 5-(3-methyl)-isoxazolyl | 3-Cl | 1 | 91–94 |
| 18 | phenyl | 5-(3-methyl)-isoxazolyl | 4-CH₃ | 1 | 119–121 |
| 19 | phenyl | 5-(3,4-dichloro)-isothiazolyl | 4-Cl | 1 | 95 |
| 20 | phenyl | 5-(3,4-dichloro)-isothiazolyl | 3-Cl₃ | 1 | 85–90 |
| 21 | phenyl | 5-(1,4-dimethyl)-thiazolyl | — | 0 | 145–147 |
| 22 | phenyl | 5-(2,3-dimethyl)-pyrazolyl | — | 0 | 146–148 |
| 23 | phenyl | 5-(2,3-dimethyl)-pyrazolyl | 3-Cl | 1 | 59–61 |
| 24 | phenyl | 2-(1-methyl)-imidiazolyl | 2-F | 1 | 230 |
| 25 | phenyl | 2-(1-methyl)-imidazolyl | 2-Cl | 1 | 162 |
| 26 | phenyl | 2-(1-methyl)-imidazolyl | 3-Cl | 1 | 150 |
| 27 | phenyl | 2-(1-methyl)-imidazolyl | 4-Cl | 1 | 134 |
| 28 | phenyl | 2-(1-phenyl)-imidazolyl | — | 0 | 125 |
| 29 | phenyl | 2-(1-phenyl)-imidazolyl | 4-Cl | 1 | 80 |
| 30 | 3-pyridyl | 5-(3-methyl)-isoxazolyl | — | 0 | 114–116 | is reacted, in the presence of a polar organic solvent (this term includes a mere diluent), such as acetonitrile, nitromethane, dimethyl formamide, hexamethylphosphoric acid triamide, and an acid-binder, such as alkali metal carbonates or alkaline earth metal carbonates, tertiary amines, such as triethylamine, with at least the theoretically necessary amount of the imidazole derivative at temperatures of from 20° to 150°C.

Advantageously, an excess of the imidazole may be used instead of a separate acid-binding agent.

In carrying out the reaction, the halide of the formula (II), either in solid form or in solution, may be added to the heterocycle, optionally in the presence of the acid acceptor. Working up of the mixture may take place in customary manner, for example by concentration, or dilution with water.

EXAMPLE 1

Preparation of Diphenyl-2-Thienyl-Imidazol-1-yl Methane

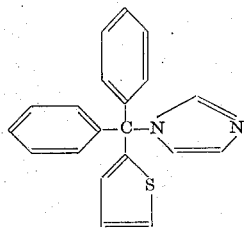

A. Preparation of Diphenyl-2-Thienyl-methyl Chloride 26.6 grams (0.1 mole) diphenyl-2-thienylcarbinol are dissolved in 150 ml dry methylene chloride, and 13 grams (0.11 mole) thionyl chloride are added slowly at 0°C. After standing for 3 hours, concentration in a vacuum is effected. The diphenyl-2-thienylmethyl chloride obtained is, without isolation, immediately further processed.

B. Preparation of Title Compound

The diphenyl-2-thienylmethyl chloride obtained above is taken up in 300 ml acetonitrile and added dropwise at 80°C. to a solution of 20 grams (0.3 mole) imidazole in 200 ml acetonitrile. After boiling for 1 hour, dilution with ice water is effected; the precipitate is filtered off with suction, followed by taking up with ether, filtration with charcoal, drying and concentration. After washing with ether/pentane, 15.7 grams of pale-brown crystals are obtained. After recrystallization from cyclohexane/benzene, the melting point of the compound lies at 182°C. (with decomposition).

The other compounds which can be used according to the invention can be prepared in corresponding manner.

The active compounds which can be used according to the invention interfere with the physiological phenomena of plant growth and can, therefore, be used as plant growth regulators.

The different effects of the active compounds depend essentially on the point in time of application, with reference to the development stage of the seed or of the plant, as well as on the concentrations applied.

Plant growth regulators are used for various purposes which are connected with the development stage of the plant.

Thus, with plant growth regulators, the seed dormancy can be broken in order to cause the seeds to germinate at a certain desired time at which the seed itself shows no readiness to germinate. The seed germination itself can either be inhibited or promoted by such active compounds, depending on the concentration applied. This inhibition or promotion relates to the seedling development.

The bud dormancy of the plants, that is to say the endogenic annual cycle, can be influenced by the active compounds, so that, for example, the plants shoot or blossom at a point in time at which they normally show no readiness to shoot or blossom.

The shoot or root growth can be promoted or inhibited by the active compounds in a manner dependent on the concentration. Thus, it is possible to inhibit very strongly the growth of the fully formed plant or to bring the plant as a whole to a more robust habitus or to produce a dwarf growth.

An example of the application of growth regulators lies in the suppression or reduction of grass growth at roadsides and waysides. Further, the growth of lawns can be inhibited by growth regulators, so that the frequency of grass-cutting, i.e., of lawn-mowing, can be reduced.

During the growth of the plant, the branching to the side can also be multiplied by a chemical breaking of the apical dominance. This phenomenon can be very useful in the propagation of plants by cuttings. On the other hand, depending on the concentration used, it is possible to inhibit the growth of side-shoots, for example in tobacco plants in order to prevent the formation of side-shoots after decapitation and thus to promote the leaf growth.

Blossom formation can also be influenced. Thus, depending on the concentration and the point in time of application, either a retarding or an acceleration of blossom formation can be achieved. In certain circumstances, a multiplication of blossom initiation can be attained, when the appropriate treatments are carried out at the time of the normal blossom formation.

The influence of the active compounds on the foliage of the plants can be so regulated that a defoliation is achieved, for example, in order to facilitate the harvest or to reduce transpiration at a time at which the plants are to be transplanted.

Fruit initiation can be promoted so that more, or seedless, fruits are formed (parthenocarpy). In certain conditions, the premature fall of fruit can be prevented, or the fruit fall can be promoted up to a certain extent in the sense of a chemical thinning out. The promotion of the fruit fall can, however, also be so exploited that the treatment is effected at the time of the harvest, so as to facilitate harvesting.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticidal surface-active agents, including emulsifying agents and/or dispersing agents, whereby, for example, in the case where water is used as diluent, organic solvents may be added as suxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g., glycol monomethyl ether, etc.), amines (e.g., ethanolamine, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.), and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95 percent by weight, and preferably 0.5 and 90 percent by weight, of the mixture, whereas carrier composition mixtures suitable for direct application or field application generally contemplate those in which the active compound is present in an amount substantially between about 0.0005–0.2 percent, preferably 0.01–0.5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active agent, such as an emulsifying agent and/or a dispersing agent, and an amount of the active compound which is effective for the purpose in question and which is generally between about 0.0005–95 percent and preferably 0.01–95 percent, by weight of the mixture.

In particular, the amount of active compound applied per unit area varies according to the purpose intended, i.e., the effect desired, and the mode of application. In general, substantially between about 0.1–100 kg of active compound per hectare are applied, preferably between about 1.0–10 kg of active compound per hectare, irrespective of the presence or absence of the carrier vehicle.

The active compounds can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

While the active compounds can be used effectively according to the pre-emergence method, they are also particularly effective when used according to the post-emergence method.

In particular, in the usual aqueous preparation, and in the case of application after emergence, the concentration of the active compound is, in general, substantially between about 0.0005–2 percent, and preferably between about 0.01–0.5 percent, by weight of the mixture with the carrier vehicle as aforesaid.

For the application time, it is often true to say that application is most favorable when a strong elongation growth has occurred, i.e., at the so-called "time of greatest shooting". In ligneous plants, application is preferred shortly after commencement of shooting. Thus, in contrast to the application of insecticides and fungicides, the application of the growth regulators is effected in a preferred space of time, the precise delimitation of which is governed by the climatic and vegetative circumstances.

The compounds to be used according to the invention are, in some cases, also effective against plant-damaging fungi and bacteria.

The activity of the substances to be used according to the invention is illustrated in the following experiments which are exemplary, but not limitative, of the invention.

EXAMPLE A

Growth Inhibition/Linseed Test
  Solvent: 40 parts by weight acetone
  Emulsifier: 0.25 part by weight alkylaryl polyglycol ether To produce a suitable preparation of active compounds, 1 part by weight of active test compound was mixed with the stated amount of solvent which contained the stated amount of emulsifier, and the concentrate was diluted with a disodium hydrogen phosphate-potassium dihydrogen phosphate buffer solution (pH6) to the desired concentration.

Two batches each of 25 linseeds were laid out on a filter paper in a Petri dish.

10 ml of the preparation of active compound were pipetted into each dish. Germination of the seeds took place in the dark at 25°C.

After 3 days, the length of the roots was determined and the growth inhibition compared with the control plant was expressed as a percentage. 100 percent denoted the standstill of growth, and 0 percent denoted a growth corresponding to that of the untreated plant.

The active compounds, the concentrations of the active compounds in ppm (=mg/kg) and the results can be seen from Table A.

TABLE A
Growth Inhibition/Linseed Test

| Active compound | Percent inhibition with— | |
|---|---|---|
| | 50 p.p.m. | 250 p.p.m. |
| Water (control) | 0 | 0 |
| Succinic acid 2,2-dimethylhydrazide (known) | 12 | 15 |
| (2-chloroethyl)-trimethyl-ammoniumchloride (known) | 20 | 30 |
| Maleic acid hydrazide (known) | 36 | 50 |
| Phenyl-4-fluorophenyl-3-(5-methyl)-isoxazolyl-imidazol-1-yl methane (Compound 5) | 60 | 64 |

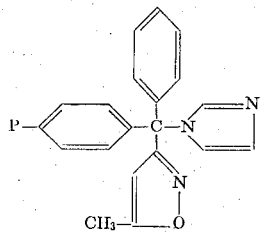

| Phenyl-4-chlorophenyl-3-(5-methyl)-isoxazolyl-imidazol-1-yl methane (Compound 6) | 90 | 92 |
|---|---|---|

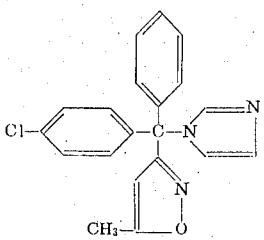

| Diphenyl-5-(3-methyl)-isoxazolyl-imidazol-1-yl methane (Compound 8) | 60 | 80 |
|---|---|---|

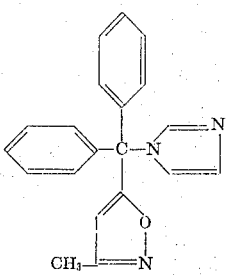

| Phenyl-4-fluorophenyl-5-(3-methyl)-isoxazolyl imidazol-1-yl methane (Compound 10) | 86 | 97 |
|---|---|---|

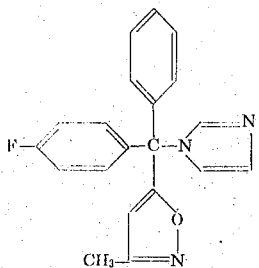

TABLE A—Continued
Growth Inhibition/Linseed Test

| Active compound | Percent inhibition with— | |
|---|---|---|
| | 50 p.p.m. | 250 p.p.m. |
| Diphenyl-1-methylimidazolyl-2-yl-imidazol-1-yl methane (Compound 14) | 86 | 97 |

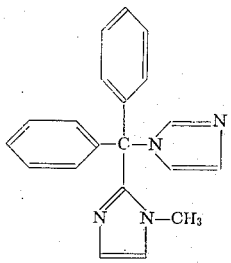

EXAMPLE B

Growth Inhibition/Oat Grains

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH6) to the desired concentration.

Two batches each of 25 oat grains were laid out on a filter paper in a Petri dish. 10 ml of the preparation of active compound were pipetted into each dish. Germination of the seeds took place in the dark at 25°C.

After 3 days, the length of the shoot was determined and the growth inhibition compared with the control plant was expressed as a percentage. 100 percent denoted the standstill of growth, and 0 percent denoted a growth corresponding to that of the untreated plant.

The active compounds, concentrations of the active compounds in ppm (=mg/kg) and the results can be seen from Table B.

TABLE B
Growth Inhibition/Oat Grains Test

| Active compound | Percent inhibition with— | |
|---|---|---|
| | 50 p.p.m. | 250 p.p.m. |
| Water (control) | 0 | 0 |
| Succinic acid 2,2-dimethylhydrazide (known) | 22 | 37 |
| (2-chloroethyl)-trimethyl-ammonium chloride (known) | 22 | 31 |
| Maleic acid hydrazide (known) | 20 | 40 |
| Diphenyl-5-(3-methyl)-isoxazolyl-imidazol-1-yl methane (Compound 8) | 40 | 80 |

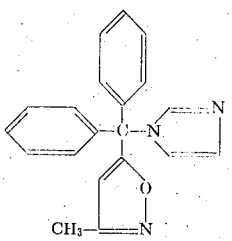

| Diphenyl-3-(5-methyl)-isoxazolyl-imidazol-1-yl methane (Compound 3) | 40 | 54 |
|---|---|---|

TABLE B — Continued

Growth Inhibition/Oat Grains Test

| Active compound | Percent inhibition with— | |
|---|---|---|
| | 50 p.p.m. | 250 p.p.m. |
| Phenyl-4-fluorophenyl-5-(3-methyl)isoxazolyl-imidazol-1-yl methane (Compound 10) | 36 | 96 |
| Diphenyl-2,3-dimethylpyrazol-5-yl-imidazol-1-yl methane (Compound 22) | 47 | 82 |
| Diphenyl-1,4-dimethylthiazol-5-yl-imidazol-1-yl methane (Compound 21) | 29 | 88 |

EXAMPLE C

Growth Inhibition/Apple Seedlings
  Solvent: 40 parts by weight acetone
  Emulsifier: 0.25 part by weight alkylarylpolyglycol ether To produce a suitable preparation of active compound, 1 part by weight of active compound was mixed with the stated amount of solvent which contained the stated amount of emulsifier and the concentrate was diluted with a disodium hydrogen phosphate-potassium dihydrogen phosphate buffer solution (pH 6) to the desired concentration.

Apple seedlings were, at a height of about 2 cm, sprayed with a preparation which contained 500 ppm of active compound.

After 7 days, the percentage inhibition of the treated plants compared with the untreated control plant was determined. With 100 percent inhibition, no growth was present; with 0 percent inhibition, the growth corresponded to that of the control plant.

The active compounds, the concentrations of the active compounds in ppm (=mg/kg) and the results can be seen from Table C.

TABLE C

Growth Inhibition/Apple Seedlings Test

| Active Compound | Percent inhibition with 500 p.p.m. |
|---|---|
| Water (control) | 0 |
| Succinic acid 2,2-dimethylhydrazide (known) | 23 |
| (2-chloroethyl)-trimethyl-ammonium chloride (known) | 25 |
| Phenyl-4-fluorophenyl-3-(5-methyl)-isoxazolyl-imidazol-1-yl methane (Compound 5) | 70 |
| Phenyl-4-chlorophenyl-3-(5-methyl)-isoxazolyl-imidazolyl-1-yl-methane (Compound 6) | 60 |
| Diphenyl-5-(3-methyl)-isoxazolyl-imidazol-1-yl methane (Compound 8) | 40 |

EXAMPLE D

Growth Inhibition/Tomato Plants
  Solvent: 40 parts by weight acetone
  Emulsifier: 0.25 part by weight alkylaryl polyglycol ether To produce a suitable preparation of active compound, 1 part by weight of active compound was mixed with the stated amount of solvent which contained the stated amount of emulsifier and the concentrate was diluted with a disodium hydrogen phosphate-potassium dihydrogen phosphate buffer solution (pH 6) to the desired concentration.

Tomato plants of a height of 10 cm were sprayed with a preparation which contained 500 ppm of active compound.

After 8 days, the percentage inhibition of the treated plants compared with the untreated control plant was determined. With 100 percent inhibition, no growth was present; with 0 percent inhibition the growth corresponds to that of the control plant.

The active compounds, the concentrations of the active compounds in ppm—mg/kg—and the results can be seen from Table D.

TABLE D
Growth Inhibition/Tomato Plants Test

| Active compound | Percent inhibition with 500 p.p.m. |
|---|---|
| Water (control) | 0 |
| Succinic acid 2,2-dimethylhydrazide (known) | 20 |
| (2-chloroethyl)-trimethyl-ammonium chloride (known) | 25 |
| Maleic acid hydrazide (known) | 33 |
| Phenyl-4-fluorophenyl-3-(5-methyl)-isoxazolyl-imidazol-1-yl methane (Compound 5) | 58 |

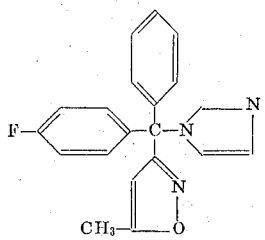

Phenyl-4-chlorophenyl-3-methylisoxazol-5-yl imidazol-1-yl methane (Compound 9) ... 45

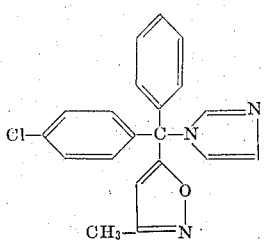

Phenyl-4-fluorophenyl-5-(3-methyl)-isoxazolyl imidazol-1-yl methane (Compound 10) ... 55

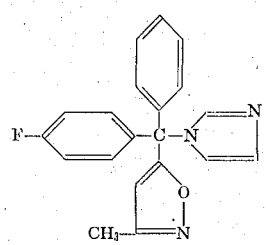

Phenyl-2-chlorophenyl-5-(3-methyl)-isoxazolyl-imidazol-1-yl methane (Compound 11) ... 58

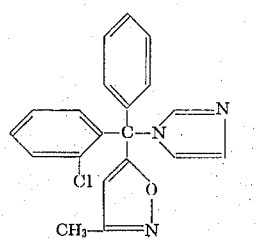

Phenyl-4-methylthiophenyl-3-methyl isoxazolyl-imidazol-1-yl methane (Compound 31) ... 49

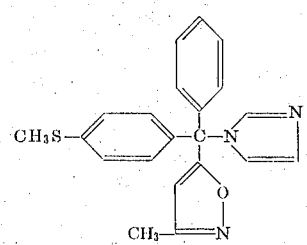

EXAMPLE E
Retardation of Blossom Formation/Tomato Plants Test

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solutionn (pH 6) to the desired concentration.

Tomato plants of a height of 20 cm were sprayed with preparations which contained 1000 ppm of active compound. Blossom formation was thereby retarded.

The active compounds and the results can be seen from Table E.

TABLE E
Retardation of Blossom Formation/Tomato Plants Test

| Active compound | Retardations in day |
|---|---|
| Water (control) | 0 |
| Diphenyl-3-(5-methyl)-isoxazolyl-imidazol-1-yl methane (Compound 3) | 8 |

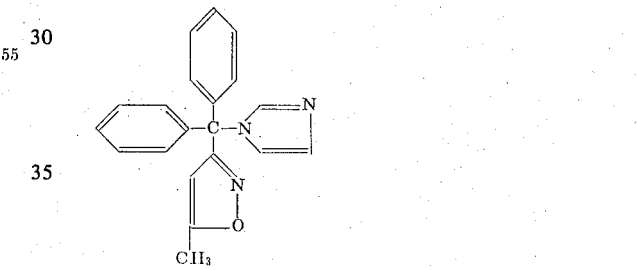

Phenyl-2-chlorophenyl-5-(3-methyl)-isoxazolyl-imidazol-1-yl methane (Compound 11) ... 6

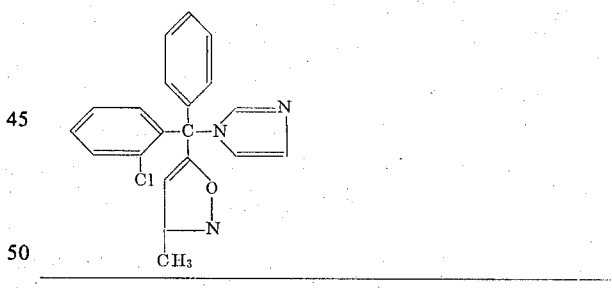

EXAMPLE F

Excessive shoot growth of petunias, zinnias, asters and carnations was prevented by treatment with the compounds according to the invention. For this purpose, the plants were sprayed, immediately at the commencement of their elongation growth, with a preparation which contained 1000 ppm of active compound. A second application could, if necessary, be effected with a prepration which contained 1000 or even only 500 ppm of active compound.

EXAMPLE G

The apical dominance of chrystanthemums and carnations was broken by the substances described. As a result, an increased formation of side-branches occurred. The latter can serve for cuttings propagation.

The plants, at a height of about 25 cm. were sprayed once to twice with preparations which contained 500 or 1000 ppm of active compound. The plants received a more compact habitus, and many lateral branchings occurred.

It will be appreciated that the instant specification and examples are set forth by way of illustration and not limitation, and that various modifications and changes may be made without departing from the spirit and scope of the present invention.

What is claimed is:

1. Method of inhibiting the growth of plants which comprises applying an effective amount of phenyl-4-chlorophenyl-3-(5-methyl)-isoxazolimidazolyl-1-yl methane.

* * * * *